United States Patent [19]
Kelso et al.

[11] Patent Number: 5,470,232
[45] Date of Patent: Nov. 28, 1995

[54] RECONFIGURABLE AIRCRAFT STICK CONTROL AND METHOD FOR CONNECTING AND REMOVING STICK CONTROL FROM AIRCRAFT SIMULATOR

[75] Inventors: Thomas M. Kelso, Great Mills; John K. Kotch, California; Damon J. Boyle, Leonardtown; David H. Meiser, Lexington Park; William P. Flaherty, Leonardtown; Bernard W. Baird, Avenue, all of Md.

[73] Assignee: The United States of America as represented by the Secretary of the Navy, Washington, D.C.

[21] Appl. No.: 129,729

[22] Filed: Sep. 29, 1993

[51] Int. Cl.⁶ ................................................. G09B 9/28
[52] U.S. Cl. ............................................................ 434/45
[58] Field of Search ............................. 434/45, 30, 29; 273/148 B, 438

[56] References Cited

U.S. PATENT DOCUMENTS

| | | | |
|---|---|---|---|
| 2,472,888 | 6/1949 | Cunningham | 434/45 X |
| 2,510,174 | 6/1950 | Heller | 434/45 |
| 2,808,659 | 10/1957 | Dehmel | 434/45 |
| 3,031,775 | 5/1962 | Cohen | 434/45 |
| 4,820,162 | 4/1989 | Ross | 434/45 |
| 4,861,269 | 8/1989 | Meenen, Jr. | 434/45 |

Primary Examiner—Paul J. Hirsch
Assistant Examiner—Jeffrey A. Smith
Attorney, Agent, or Firm—James V. Tura; Susan E. Verona

[57] ABSTRACT

A reconfigurable aircraft stick control for an aircraft simulator that enables pitch and roll to be simulated. It includes a generic base that has mounting means that are adapted to be connected to a stick control of the type having a standard production grip as well as a stick control that uses a yoke. The control sticks include linkages that are easily connected to the mounting means on the base so that control sticks can be exchanged with minimum expenditure of time and effort to thereby simulate the control sticks on aircraft that are being simulated. Torque motors can be connected to the simulator to detect the speed and displacement of the control stick and to provide resistance to movement of the control sticks so as to simulate actual flying conditions.

11 Claims, 5 Drawing Sheets

5,470,232

RECONFIGURABLE AIRCRAFT STICK CONTROL AND METHOD FOR CONNECTING AND REMOVING STICK CONTROL FROM AIRCRAFT SIMULATOR

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention relates to a reconfigurable aircraft stick control, and more particularly, to such a control for a flight simulator.

BACKGROUND OF THE INVENTION

To be cost effective, flight simulators must be able to approximate the cockpit controls that will be available in any aircraft that the pilot who is using the simulator, or who is training on the simulator is likely to encounter.

It is known through the use of avionics software to simulate the front instrument console of nearly any aircraft. However, for each aircraft which is simulated, a different stick control is necessary. Some aircraft stick controls include yokes having a grip that involves a wheel held in both hands, while others have single handed grips.

It would be advantageous to have a stick control in a flight simulator that can be readily adapted to that which corresponds to the aircraft whose console is simulated.

This would be particularly advantageous since it would dramatically reduce the cost of reconfiguring the simulator for each aircraft whose console is displayed.

Further, if there was a simple mechanism by which stick controls could be exchanged, scheduling of simulator use could be adapted to the convenience of the trainees schedule rather than forcing them to adjust their schedules to agree with the times that a simulator is configured for a particular aircraft.

With the foregoing in mind, the invention relates to a generic base for the stick control of an aircraft simulator. The base includes a first member that defines a first pitch axis and means for supporting that member for rotation about the first pitch axis. A second member is supported by the first member so that it moves with the first member about the pitch axis. Means are connected to the first and second members for generating electrical signals that reflect the movement of the members about the respective axes to thereby simulate the pitch and roll of an aircraft. A support for the stick control is provided. The support is mounted on the first member so that it can move the first member about the first pitch axis, and so that it can move the second member about the first roll axis.

The invention also relates to an interchangeable stick control for an aircraft simulator that is to be connected to a generic base. The interchangeable stick control includes a grip that corresponds to that on a particular aircraft. A connecting member is provided for connecting the grip to a generic base. The connecting member includes means that define a first pivot about which the grip can pivot relative to the support to simulate the stick movement necessary to roll that particular aircraft. The connecting member includes means defining a second pivot which is laterally spaced from the first pivot and movable about the first pivot. A first connecting rod is provided. One end of the connecting rod is connected to the support for the grip. The other end of the connecting rod is connected to the base and the first connecting rod is of a predetermined length so that the height of the grip corresponds to that on that particular aircraft. A second connecting rod is provided. One end of the second connecting rod is pivotally connected to the second pivot. The other end of the connecting rod is connected to the base.

Finally, the invention relates to a method for connecting and removing a stick control from an aircraft simulator where the simulator includes a first member that is rotatable about a first pitch axis and includes a second member that can be connected to said first member for movement with it, and wherein the control stick includes a grip on a support that is pivotally connected to one end of a first connecting rod and which support includes a second connecting rod that is pivotally connected to the support at a location that is spaced from the first pivot. The method comprises the steps of providing a grip that corresponds to that on a particular aircraft, dimensioning the first and second connecting rods so that when they are connected to said first and second members the grip is a height that corresponds to that particular aircraft, connecting the first connecting rod to the first member by a releasable compression member, and pivotally connecting the second connecting rod to the second member by a pivot pin.

BRIEF DESCRIPTION OF THE DRAWINGS

The invention can best be described by referring to the accompanying drawing where a presently preferred form of the invention is shown and where.

DETAILED DESCRIPTION OF THE PREFERRED EMBODIMENT

Figure 1:
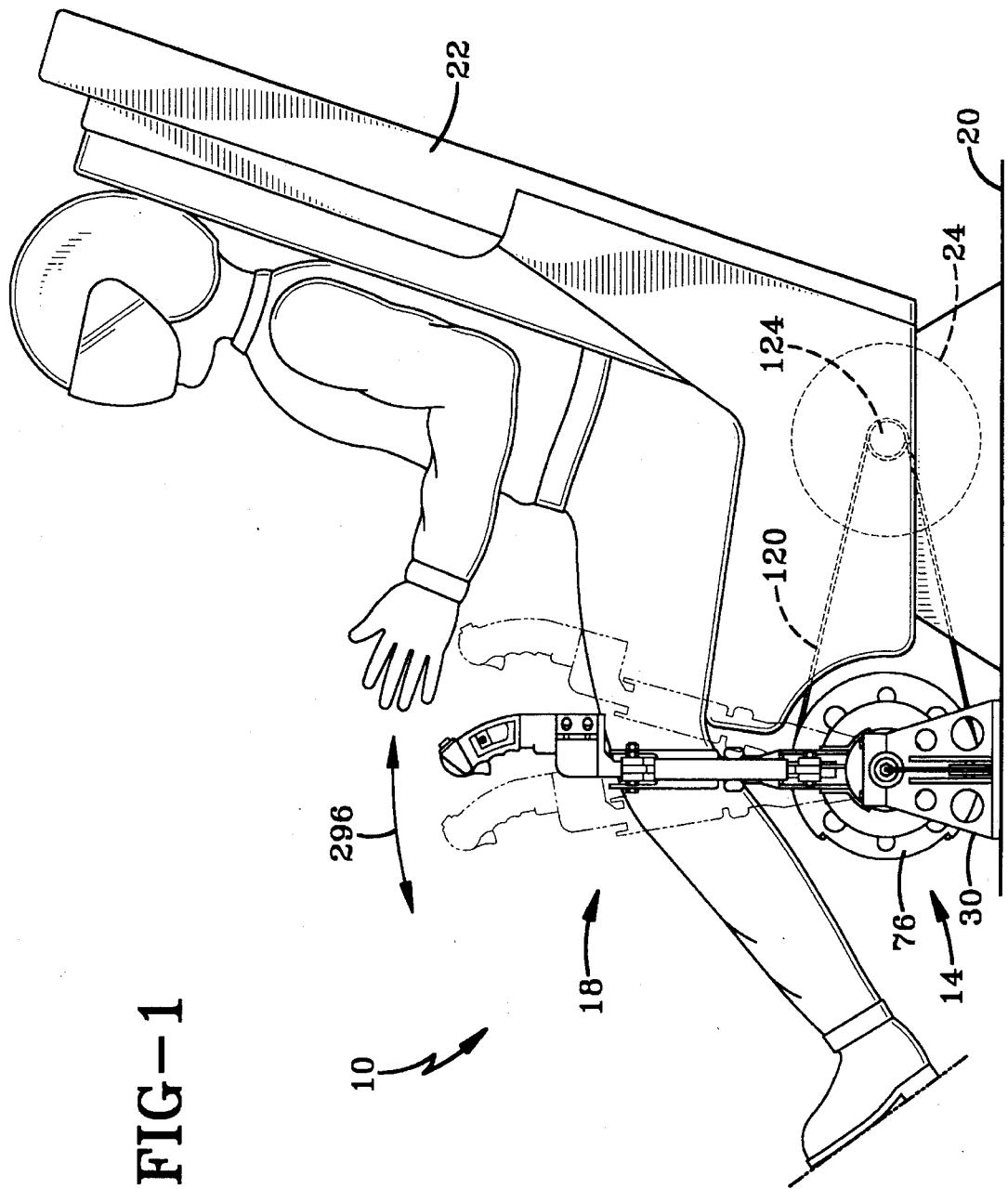
FIG. 1 is a side elevation view of one presently preferred form of the invention.
Figure 2:
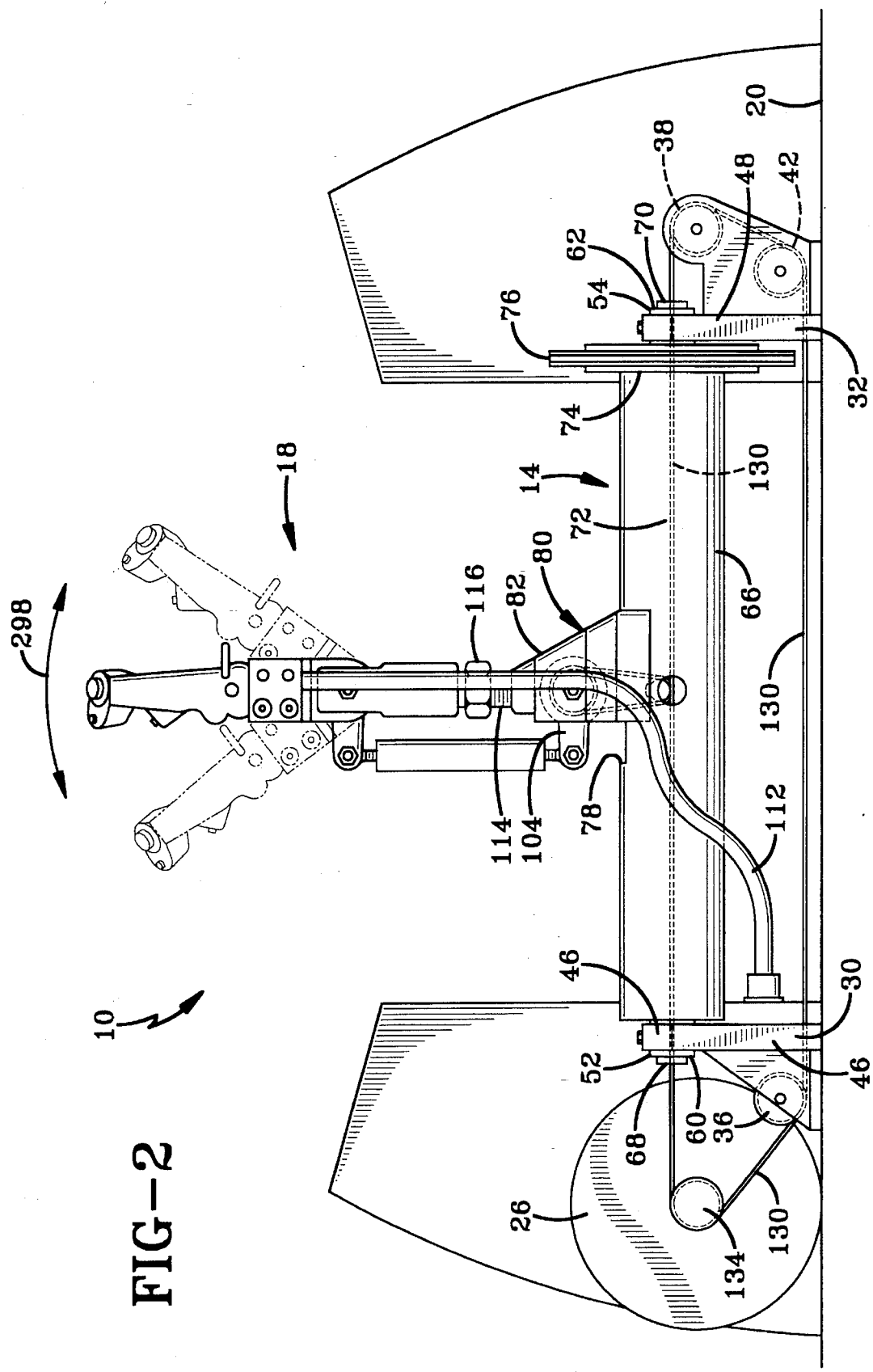
FIG. 2 is an elevation view of the form of the invention shown in FIG. 1.

As best seen in FIGS. 1 and 2 the reconfigurable stick control assembly 10 includes a generic base 14 and an interchangeable control stick 18. The assembly 10 is mounted on the floor 20 of the flight simulator and can be easily reached by the pilot, sitting in a seat having a back member 22.

The base 14 is connected to a pitch movement torque motor 24 and a roll movement torque motor 26 (see FIG. 3) as will be more fully explained. The torque motors are mounted on floor 20.

Figure 3:
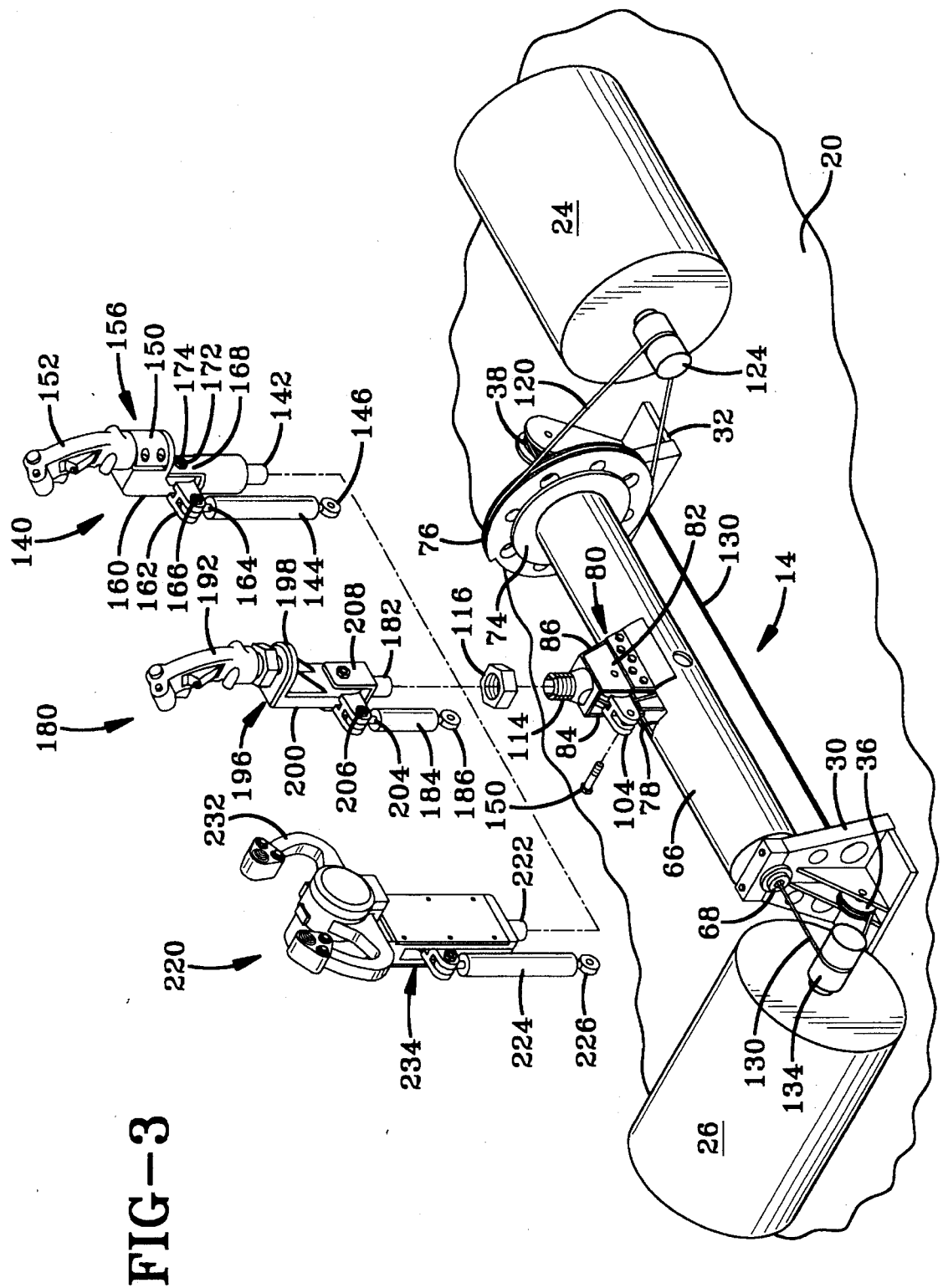
FIG. 3 is an exploded perspective view showing the invention with three interchangeable stick controls.

As best seen in FIG. 3, the base 14 comprises two spaced support brackets 30 and 32 that are supported on the floor 20 of the simulator. Bracket 30 supports sheave 36 near floor 20. Bracket 32 supports an upper sheave 38 and a lower sheave 42 (FIG. 2). The upwardly directed legs 46 and 48 on each bracket 30 and 32 include openings 52 and 54 in which the reduced ends 60 and 62 of an elongated, hollow, cylindrical member 66 are pivotally journaled. The caps on the reduced ends 60 and 62 include coaxial apertures 68 and 70. The apertures 68 and 70 define a first pitch axis 72 for the assembly.

A radially outwardly directed flange 74 is supported on the outer wall of member 66 adjacent bracket 32. The flange supports a radially directed sheave 76.

Figure 4:
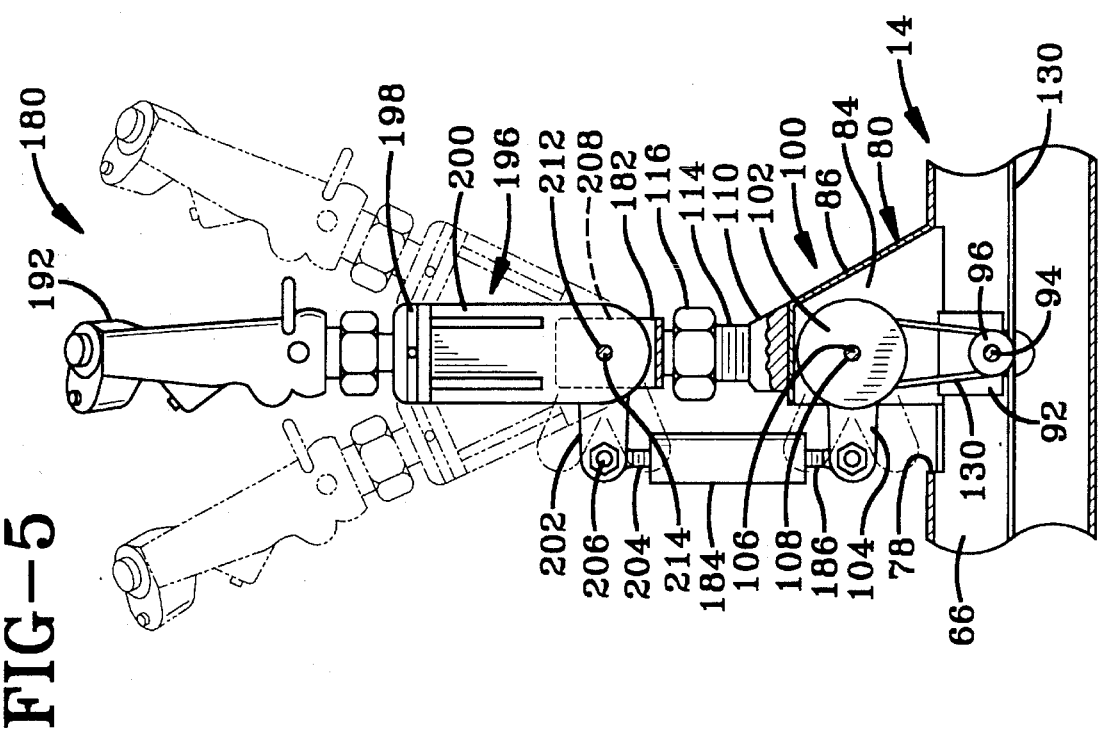
FIG. 4 is a detailed view of one of the stick controls illustrated in FIG. 3.

Referring to FIGS. 3 and 4 an opening 78 is formed in member 66 intermediate its ends. A bracket 80 comprising front and rear walls 82 and 84 and sidewall 86 is fixedly connected to the member 66 in overlying relation to opening 78.

A mounting plate 92 is supported by the outer wall of the first member 66. The mounting plate 92 includes a mounting pin 94 on which a sheave 96 is mounted. The mounting plate 92, pin 94 and sheave 96 are sized so that the perimeter of the sheave is tangential to the first pitch axis 72.

A crank 100 comprising a sheave 102 and a laterally extending arm 104 is pivotally supported by pin 106 which in turn is mounted on bracket 80. The pin 106 defines a first roll axis 108 as will be more fully described.

The distal end of arm 104 includes an opening by which it can be connected to a control rod, as to be further described with reference to FIG. 4 and also FIGS. 5 and 6.

An electrical cable 112, most clearly seen in FIG. 2, is releasably connected between the stick control 18 and the base 14 for sending signals that correspond to commands for aiming and firing weapons carried by the aircraft being simulated in response to the actuation of buttons and switches on the stick control.

A boss 110, shown in FIG. 4, extends upwardly from the top wall of bracket 80. The boss 110 supports an upwardly directed slotted, threaded compression sleeve 114. A nut 116 is threadingly received over the compression sleeve 114. As is well known, the portions of compression sleeve 114 between its slots are disposed so that the opening defined by the compression sleeve is somewhat larger at its top then at its bottom. As the nut 116 is threaded up the sleeve, the portions of the sleeve are moved toward its axis to securely grasp whatever has been placed in the sleeve.

As seen in FIGS 1 and 3, a continuous, braided, pitch cable 120 is connected between the sheave 76 and the rotor 124 of the torque motor 24. Thus, as the member 66 pivots around first pitch axis 72, rotor 124 rotates about its axis in response, generating an electrical signal which is proportional to the displacement and speed with which the member 66 moves about the first pitch axis 72.

As best seen in FIGS. 2, a continuous, braided, roll cable 130 is wrapped around sheaves 96 and 102 and extends laterally along the first pitch axis 72. Roll cable 130 exits member 66 (see FIG. 3) through an aperture 68 in the end 60. It then is wrapped around the rotor 134 of the torque motor 26. The remaining portion of the cable 130 exits the member 66 through aperture 70 at its other end. It is wrapped around sheaves 38 and 42 to complete the loop. As is apparent from FIGS. 2 and 4, movement of arm 104 about the first roll axis 108 causes the cable 130 to move thereby generating an electric signal which is proportional to the speed and displacement of the movement of the arm.

FIG. 3 illustrates three different stick control configurations that can be connected to the generic base 14. The stick control configurations include a high roll sticks 140 and 180 and a yoke control 220.

Each of the stick controls 140, 180 and 220 includes a linkage that includes two connecting rods, thus stick controls 140, 180 and 220 include a first connecting rod 142, 182 and 222 that is receivable in compression sleeve 114. Preferable, the first connecting rods include alignment keys that correspond with a key-way slot in the sleeve 114 to assure that the connecting rods are properly installed. The linkage in each stick control 140, 180 and 220 also include a second connecting rod 144, 184 and 224, the distal ends of which 146, 186 and 226 are pivotally connectable to arm 104 by a suitable pin 150.

As best seen in FIGS. 3 and 4 stick 140 includes a standard one hand production grip 152 which is mounted on an inverted generally "L" shaped bracket 156 having a generally horizontally extending base 158 and a downwardly directed leg 160. The downwardly directed leg 160 supports a laterally extending arm having a clevis 162. The clevis 162 is pivotally connected to the upper end 164 of connecting rod 144 by pin 166. The upper end of connecting rod 142 includes an upwardly extending clevis 168 that is pivotally connected to the leg 160 of the "L" shaped bracket 156 by a pin 172 that defines a second roll axis 174.

The stick control 140 just described is a complete unit in that it can be easily and quickly connected to and removed from the base 14 by loosening nut 116, removing pin 150 from arm 104, and detaching electrical cable 112.

Figure 5:
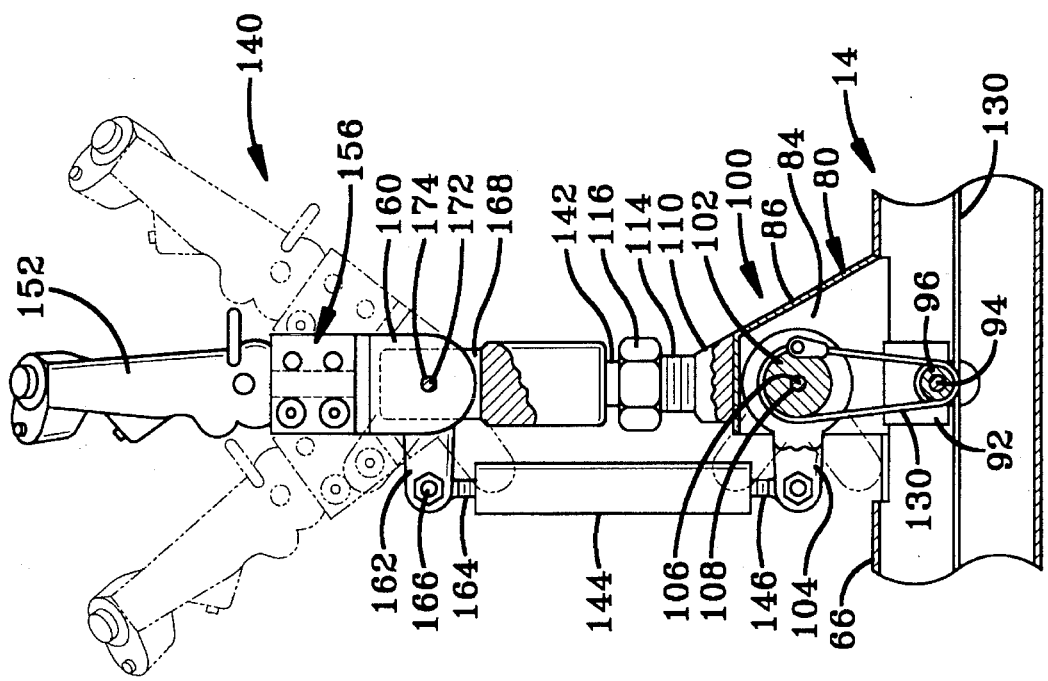
FIG. 5 is a detailed view of another one of the stick controls illustrated in FIG. 3.

As best seen in FIGS. 3 and 5, stick control 180 includes a standard one hand production grip 192 which is mounted on an inverted generally "L" shaped bracket 196 by a generally horizontally extending base 198 and a downwardly depending leg 200.

The downwardly directed leg 200 includes a laterally extending arm that includes clevis 202 which is connected to the upper end 204 of a second connecting rod 184 by a pivot pin 206.

The upper end of connecting rod 182 includes an upwardly directed clevis 208 that is pivotally connected to the leg 200 of bracket 196 by a pin 212 to define a second roll axis 214.

Figure 6:
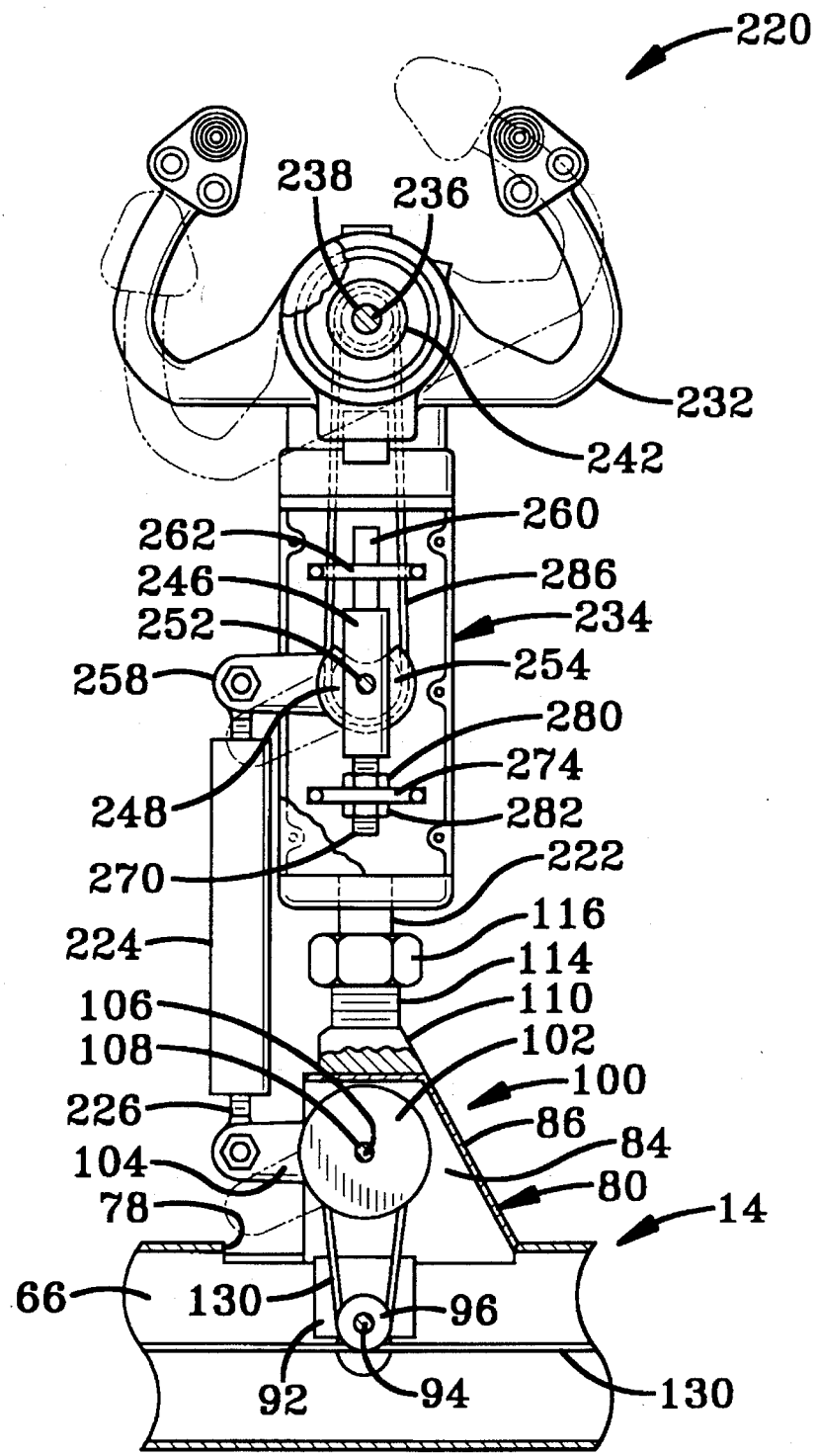
FIG. 6 is a detail view of still another one of the stick controls illustrated in FIG. 3.

As best seen in FIGS. 3 and 6, the yoke 220 comprises a control wheel 232 that is held in both hands. The control wheel 232 is supported in an elongated housing 234 by a pivot pin 236 that defines a second roll axis 238.

As seen in FIG. 6 the control wheel 232 supports a sheave 242 that is coaxial with the pin 236 and is fixed to control wheel 232 for movement with it.

The lower portion of the housing 234 includes a bracket 246 that pivotally supports a crank 248 with pin 252. The crank 248 includes a sheave 254 connected to the bracket 246 by pin 252 and a laterally extending arm 258 connected to sheave 254.

The bracket 246 includes an upper guide shaft 260 that is received in an opening (not shown) in pillow block 262. The pillow block 262 is fixed to the housing 234. The upper guide shaft 260 is held against rotation by the pillow block 262. There are several ways that this can be done. However, it is preferred that both the shaft and opening be rectangular.

The bracket 246 also includes a lower guide shaft 270 that extends through an opening (not shown) in a pillow block 274. The pillow block 274 is fixed to housing 234. The lower guide shaft 270 is threaded and includes adjustment nuts 280 and 282.

A continuous braided cable 286 is looped over sheave 242 and 254. The tension in the cable 286 is adjusted by selectively loosening and tightening adjustment nuts 280 and 282 in a well known manner.

As best seen in FIG. 6, pivotal movement of the control wheel 232 is transmitted to crank 248 and control rod 224 by sheave 242 and cable 286.

In a manner similar to that which has been described, the yoke 220 is easily connected to the base 14 by placing the lower end of connecting rod 222 in compression sleeve 114 and tightening nut 116, connecting the lower end of connecting rod 224 to arm 104, and connecting electrical cable 112.

While each of the three stick controls just described operates in its own unique manner, they have been designed so that each of them can readily be connected to and disconnected from base 14. As seen in FIGS. 1 and 3, when the control stick 18 is moved forwardly and rearwardly as indicated by arrow 296 to simulate a desire by the pilot to move the aircraft around its pitch axis, the first member 66 is rotated about pitch axis 72 and through cable 120 engages and generates a signal in the pitch torque motor 24 that reflects the speed and displacement of the grip.

Similarly, if the pilot desires to simulate a rolling action of the aircraft, the grip of control stick 18 is pivoted to the left or the right as indicated by arrow 298 around the second roll axis 174 (FIG. 4) or 214 (FIG. 5). This causes clevis 162 (FIG. 4) or 202 (FIG. 5) to pivot around the second roll axis 174. This movement is transmitted by the second connecting rods 144 (FIG. 4) and 184 (FIG. 5) to arm 104 on base 14. Movement of arm 104 causes the crank 100 to rotate with the result that the braided cable 130 that is entrained around it moves the rotor 134 on roll torque motor 26 to generate a signal that reflects the speed and displacement of the grip.

With regard to the yoke illustrated in FIG. 6, turning the yoke wheel 232 as shown in phantom causes cable 286 to rotate crank 248. This causes second connecting rod 224 to reciprocate along its axis to rotate crank 102 and thereby drive cable 130 and the rotor 134.

The torque motors 24 and 26 can be connected to a suitable controller so that they feed back resistive loads to the stick control. The resistive loads may be arranged so that they vary in accordance with the degree of displacement or speed of movement of the stick, simulated weather conditions and maneuvers, or simulated emergencies.

While the invention has been described with regard to certain particular forms, it is apparent that other forms will be obvious to those skilled in the art. Thus, the scope of the invention should not be limited by the forgoing description, but rather, by the scope of the appended claims.

What we claim is:

1. An assembly having a generic base with mounting means to provide for interchangeability of stick controls of an aircraft simulator each having a particular connecting member, said assembly comprising:

a first member defining a first pitch axis;

means for mounting said first member for rotation about said first pitch axis, said mounting means comprising said generic base;

a second member defining a first roll axis, said second member being supported by said first member for movement with said first member about said pitch axis;

means connected to said first and second members for generating electrical signals that reflect the movement of said first and second members about their respective axes to thereby simulate the pitching and rolling of an aircraft; and means for releasably supporting said particular connecting members of said stick controls, said releasable supporting means being mounted on said first member so that it can move said first member about said first pitch axis and so that it can move said second member about said first roll axis.

2. The assembly as defined in claim 1, wherein said stick controls for said aircraft simulator comprise:

a grip dimensioned to correspond to that on a particular aircraft;

a support stick for supporting said grip, said stick support including means defining a first pivot about which said grip can pivot relative to said stick support to simulate the stick control movement necessary to roll that particular aircraft, said stick support including means defining a second pivot, said second pivot being spaced from said first pivot;

a first connecting rod comprising said particular connecting member, one end of said first connecting rod being connected to said stick support for said grip, the other end of the first connecting rod being connectable to said means for releasably supporting said particular connecting members of said stick controls; and a second connecting rod, one end of said second connecting rod being pivotally connected to said second pivot, and the other end of said second connecting rod being connectable to said first member.

3. The assembly as defined in claim 2, wherein:

said second connecting rod is connectable to the distal end of an arm connected to said second member.

4. The assembly as defined in claim 3, wherein:

said distal end of said arm is releasably and pivotally connected by a pin; and said means for releasably supporting said particular connecting members of said stick controls comprises a compression fitting on said first member, said compression fitting serving as means for releasably connecting said first connecting rod to said first member.

5. The assembly as defined in claim 4, wherein:

said means for releasably connecting said first connecting rod to said first member includes a hollow split sleeve supported on said first member, one end of said first connecting rod being receivable in said sleeve, and threaded means engagable with said sleeve for pressing it against said first connecting rod to retain said first connecting rod in engagement with said sleeve.

6. An assembly having a generic base with a mounting means to provide for interchangeability of stick controls of an aircraft simulator each having a particular connecting member, said assembly comprising:

a first member comprising an elongated, hollow generally cylindrical member and defining a first pitch axis;

means for mounting said first member for rotation about said first pitch axis, said mounting means comprising said generic base;

a second member defining a first roll axis, said second member being supported by said first member for movement with said first member about said pitch axis, said second member comprising means for converting rotary motion of said second member around said first roll axis to movement along said first pitch axis;

means connected to said first and second members for generating electrical signals that reflect the movement of said first and second members about their respective axes to thereby simulate the pitching and rolling of an aircraft; and means for releasably supporting said particular connecting members of said stick controls, said releasable supporting means being mounted on said first member so that it can move said first member about said first pitch axis and so that it can move said second member about said first roll axis.

7. The assembly as defined in claim 6, wherein said second member includes a bracket mounted on said elongated, hollow generally cylindrical member, and a crank for generating said rotary motion mounted on said bracket for pivotal movement about said first roll axis, said bracket supporting said crank generating said rotary motion, and wherein said means for converting rotary motion includes first and second sheaves coupled to said bracket.

8. The assembly as defined in claim 7 wherein:

each of said stick controls includes a gripping member and one of said particular connecting members;

one of said gripping members being connected to its respective said connecting member by means that define a second roll axis;

said first and second roll axes being coplanar and spaced from each other; and said respective connecting member being connected to said second member and to said means for converting rotary motion so that said respective stick control is operative to rotate said first member about said first pitch axis to simulate the pitching of an aircraft being simulated.

9. The assembly as defined in claim 7, wherein:

said crank comprises a pivot pin, an arm, and said first and second sheaves coupled to said bracket;

said bracket further comprises means for mounting said crank generating said rotary motion on said first member so that it can rotate about said first roll axis;

said second sheave further comprising means for mounting on said first member; and said means for mounting second sheave further comprising means for generating electrical signals that reflect the movement of said first and second members about their respective axes.

10. The assembly as defined in claim 7, wherein:

each of said stick controls includes a gripping member and one of said particular connecting members;

one of said gripping member being connected to its respective said connecting member by means that define a second roll axis;

said first and second roll axes being parallel to and spaced from each other; and said respective connecting member being connected to said second member and to said means for converting rotary motion so that said respective stick control is operative to rotate said first member about said first pitch axis to simulate pitching and rolling of an aircraft being simulated.

11. A method for connecting and removing a stick control from an aircraft simulator, wherein the simulator includes a first member that is rotatable about a first pitch axis and includes a second member that is connected to said first member for movement with the first member, and wherein said control stick includes a grip on a support thereof that is pivotally connected to one end of a first rod comprising a first pivot means and which support includes a second rod pivotally connected to said support at a location that is spaced apart from said first pivot means, comprising the steps of:

providing a grip dimensioned to correspond to that on a particular aircraft;

dimensioning said first and second connecting rods so that when they are connected to said first and second members, said grip is at a height that corresponds to that particular aircraft;

connecting said first connecting rod to said first member by a releasable compression member; and pivotally connecting said second connecting rod to said second member by a pivot pin.

* * * * *